F. C. OLDHAM.
INSERTIBLE SAW TOOTH.
APPLICATION FILED NOV. 15, 1909. RENEWED JULY 6, 1911.
1,017,013.
Patented Feb. 13, 1912.
2 SHEETS—SHEET 1.
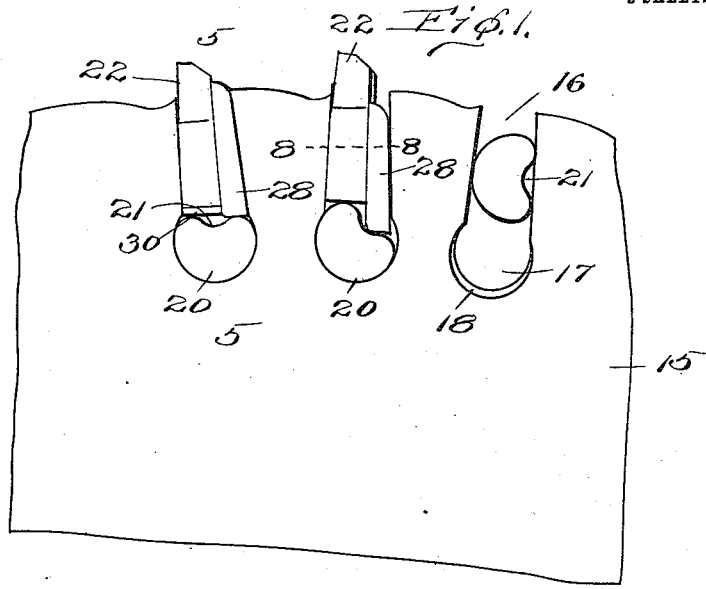
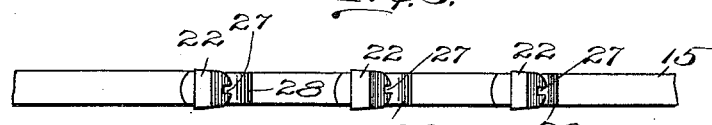
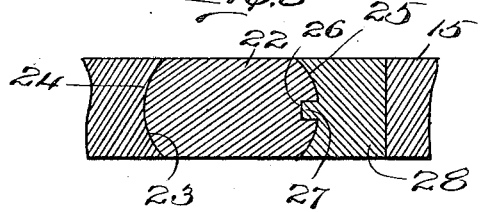
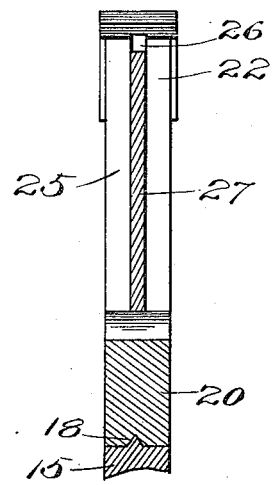
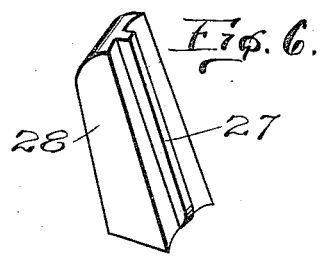
Witnesses
J. M. Fowler Jr.
Inventor
Frederick C. Oldham
By Mason Fenwick Lawrence
Attorneys F. C. OLDHAM.
INSERTIBLE SAW TOOTH.
APPLICATION FILED NOV. 15, 1909. RENEWED JULY 6, 1911.
1,017,013.
Patented Feb. 13, 1912.
2 SHEETS—SHEET 2.
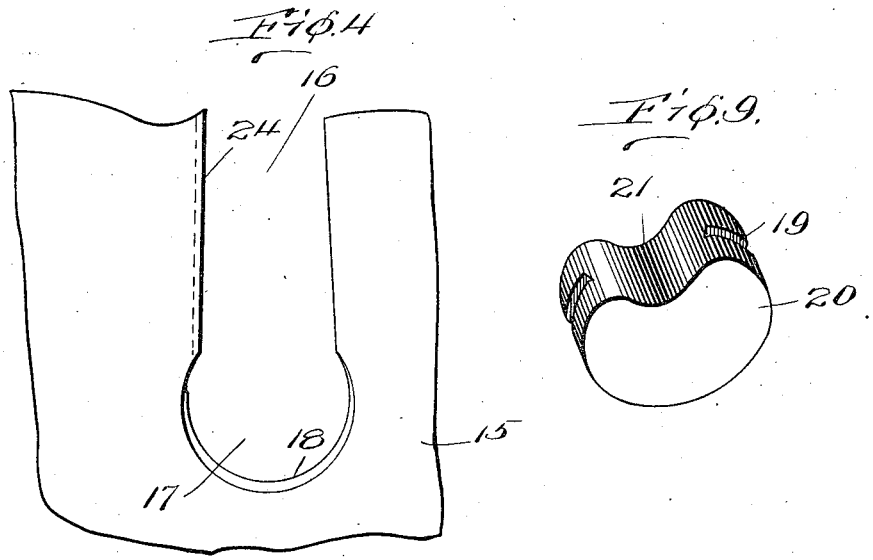
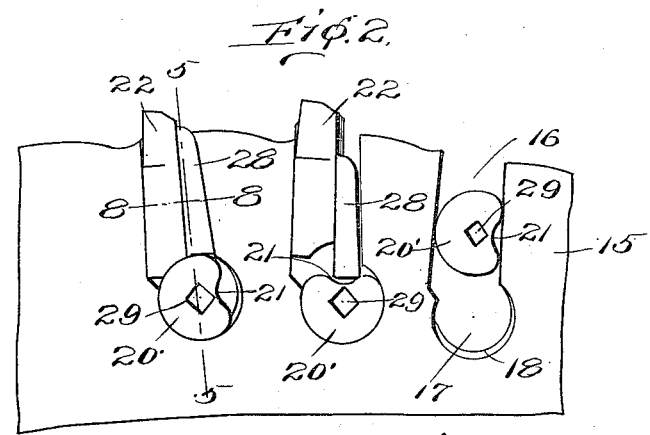
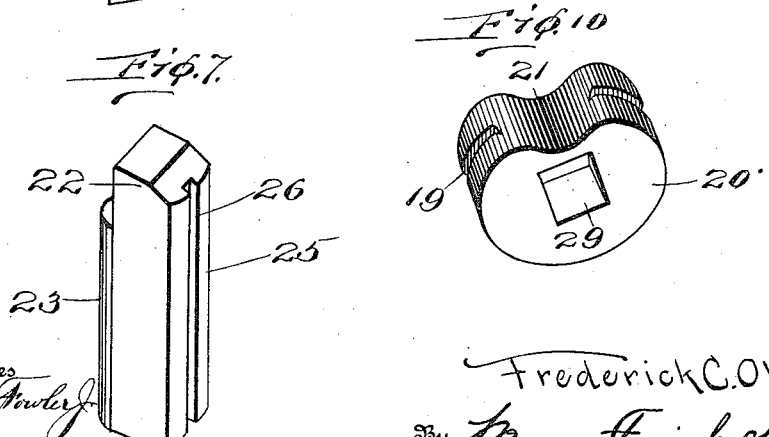
Inventor
Frederick C. Oldham,
By
Attorneys
Witnesses

UNITED STATES PATENT OFFICE.

FREDERICK C. OLDHAM, OF BROOKLYN, NEW YORK.

INSERTIBLE SAW-TOOTH.

1,017,013.  Specification of Letters Patent.  Patented Feb. 13, 1912.

Application filed November 15, 1909, Serial No. 528,256. Renewed July 6, 1911. Serial No. 637,093.

*To all whom it may concern:*

Be it known that I, FREDERICK C. OLDHAM, a citizen of the United States, residing at Brooklyn, in the county of Kings and State of New York, have invented certain new and useful Improvements in Insertible Saw-Teeth; and I do hereby declare the following to be a full, clear, and exact description of the invention, such as will enable others skilled in the art to which it appertains to make and use the same.

This invention relates to insertible saw teeth, and has for an object to provide an insertible tooth of improved construction, and improved means for retaining the same in association with the saw.

A further object of the invention is to provide an insertible saw tooth with a wedge member for maintaining the same in the aperture of the saw, and with a cam adapted to control the action of the tooth and wedge.

A further object of the invention is to provide in a saw an insertible tooth with a wedge member for maintaining the same in position, and a cam for controlling the tooth and wedge, and with improved means for manipulating the cam.

With these and other objects in view, the invention comprises certain novel constructions, combinations and arrangements of parts, as will be hereinafter fully described and claimed.

In the drawings:—Figure 1 is a view of a fragment of a saw in side elevation showing one specific embodiment of the inserted tooth. Fig. 2 is a view in side elevation of a slightly different embodiment, and securing means. Fig. 3 is a view in edge elevation of a saw with the insertible tooth associated therewith. Fig. 4 is a view in side elevation of an enlarged cavity adapted to receive the insertible tooth and connecting members. Fig. 5 is a view in section as on lines 5—5 of Figs. 1 and 2. Fig. 6 is a perspective view of the wedge member. Fig. 7 is a perspective view of the tooth member. Fig. 8 is a transverse, sectional view through the tooth and wedge member as on lines 8—8 of Figs. 1 and 2. Fig. 9 is a perspective view of the cam as employed in Fig. 1. Fig. 10 is a perspective view of the cam as employed in Fig. 2.

Like characters of reference designate corresponding parts throughout the several views.

The saw upon which the present insertible tooth is mounted may be of any ordinary type as drag saw, band saw, rotary saw or the like, and is shown conventionally at 15, it being understood, however, that ordinarily the tooth will probably be associated with a rotary saw.

The saw of whatever type is provided with slots 16 having their sides tapered, being narrower at the edge of the saw than at their inner ends and provided at their inner ends with communicating parti-circular cam ways. The cam way 17 is provided along its curved side with a rib 18 adapted to engage the groove 19 of the cam 20 as shown at Figs. 1 and 9, or 20' as shown at Figs. 2 and 10. The cam 20 or 20' is formed upon its exterior upon an arc of a circle corresponding to and fitting the circular recess 17 in the saw and with a concavity 21 upon one side.

Disposed within the slot 16 is a tooth 22 having any improved form of operative outer extremity and provided along one side with a convex edge 23 proportioned to engage a complementary concavity 24 formed in the side of the slot 16 as shown in detail at Fig. 8 and in dotted lines at Fig. 4. At its opposite edge the tooth 22 is also curved as indicated at 25 and is provided with a groove 26 proportioned to receive a tongue 27 formed upon the wedge member 28. Both the tooth member 22 and the wedge member 28 are formed slightly tapered, wider at their inner or lower ends and when in position as shown at the left of Figs. 1 and 2, the centrifugal action of the saw, if a rotary, cannot throw the teeth out from the slot, because of such wedging formation and the cams 20 or 20' are positioned to prevent inward thrust of the tooth or wedge member from engaging the article being operated upon.

To loosen the tooth and permit its removal as shown in Fig. 1, the wedge member 28 may be driven inwardly by any convenient implement thereby turning the cam as shown in the center at Fig. 1 and forcing the tooth member 22 upwardly, it being of a less pronounced taper than the wedge member, which permits the tooth to move outwardly as the wedge member moves inwardly, under the action of the rotating cam 20. The cam 20 is also of such proportion that with the tooth and wedge removed the cam may also be removed through the slot 16 as shown at the right of Fig. 1. At Fig. 2 means for manually rotating the cam is shown comprising a squared or multi-angular opening 29 into which a squared tool may be inserted to rotate the cam as shown at Fig. 2. With the cam disposed at the position shown at the left of Fig. 1 both the tooth and the wedge are locked in operative position and cannot be moved. With the cam rotated to the position shown at the center in Fig. 2, the wedge 28 may be driven downwardly, thus loosening the tooth and wedge member whereupon the tooth may be removed and then the wedge removed and the cam also moved through the slot 16 as shown at the right of Fig. 2.

It will be understood that in the type shown at Fig. 1 when the tooth is to be inserted the cam is inserted as shown at the right to the position shown at the center and the wedge member 28 first inserted then the tooth member inserted, and pressure or pounding applied to the extremity of the tooth member 22 to force it to the position shown at the left in Fig. 1, rotating therewith the cam 20 and forcing the lock or wedge member 28 outwardly to locking position. When the tooth is to be inserted in the type shown at Fig. 2 the cam is similarly inserted in the slot as shown at the right, the wedge member 28 then inserted until it engages the cam, and the tooth also inserted as shown at the center in Fig. 2. The cam is then rotated by inserting the tool in the opening 29 to force both tooth and the wedge member outwardly as shown at the left of Fig. 2. In Fig. 1 a filler 30 is shown beneath the lower end of the tooth 22, this being employed to lift the tooth to compensate for wear of the tooth and the thickness of such filler is varied as found necessary for such compensation. It will, of course, be understood that the tooth originally may be made of such length that the filler will not be required and the filler inserted after the tooth is sufficiently worn to require the same. The filler would be in cross section the same as the tooth to engage upon one side the concavity 24 and upon the opposite side the rib 27 of the wedge member 28 by which such filler will be maintained in position.

What I claim is:—

1. The combination with a saw having a slot extending inward from its edge and increasing in width and terminating in a segmental opening, of a saw tooth having substantially parallel sides insertible within the slot, a wedge member adapted to fill the space between the tooth and the adjacent side of the slot, and a cam inserted within the segmental opening tending to move the wedge longitudinally of the tooth and slot when rotated.

2. The combination with a saw having a slot extending inward from its edge, said slot increasing in width and terminating in a segmental opening, a tooth having approximately parallel sides, narrower than the slot and having tongue and groove connections with one side of the slot, a wedge complementary to the tooth and adapted to fill the opening between the tooth and the adjacent side of the slot, tongue and groove connections between the wedge and the tooth, and a cam disposed within the opening adapted when rotated to force the wedge longitudinally outwardly.

3. The combination with a saw having a slot projecting inwardly from its edge and terminating in a segmental opening, of a cam disposed within the segmental opening and having tongue and groove connections therewith, a tooth member having substantially parallel sides disposed within the slot, and resting upon the cam and having tongue and groove connections with the side of the slot, a wedge member complementary to the tooth disposed within the slot and having tongue and groove connection with the tooth, the cam being proportioned when rotated to force the wedge member longitudinally outwardly into binding engagement with the tooth and opposed wall of the slot.

4. The combination with a saw having a slot extending inward from its edge increasing in width and terminating in a segmental opening, of a crescent-shaped cam disposed within the opening and having tongue and groove connection therewith, a tooth having substantially parallel sides disposed within the slot, and resting upon the cam, a complementary wedge disposed between the tooth and the wall of the slot and bearing upon the cam in such manner that when the tooth is driven inwardly the cam is rotated to force the wedge outwardly.

5. The combination with a saw having a slot extending inwardly from its edge increasing in width and terminating in a segmental opening, of a crescent-shaped cam disposed within the opening, a tooth inserted within the opening and bearing upon one horn of the crescent, and a complementary wedge inserted between the tooth and the sides of the slot and bearing upon the other horn of the crescent.

6. The combination with a saw having a slot extending inwardly from its edge increasing in width and terminating in a segmental opening, a crescent-shaped cam disposed and rotatable within the opening and having tongue and groove connection therewith, a tooth insertible within the slot, and bearing upon one horn of the crescent, and a wedge member insertible within the slot beside the tooth and bearing upon the other horn of the crescent, and capable of being forced outwardly when the cam is rotated by driving inwardly on the tooth.

In testimony whereof I affix my signature in presence of two witnesses.

FREDERICK C. OLDHAM.

Witnesses:
GILBERT V. OLDHAM,
CHRISTIAN E. HERBST.

Copies of this patent may be obtained for five cents each, by addressing the "Commissioner of Patents, Washington, D. C."